O. C. KUEBLER.
COLLAPSIBLE AND VENTILATING BELL OR FORCING GLASS.
APPLICATION FILED APR. 16, 1919.
1,392,178.
Patented Sept. 27, 1921.
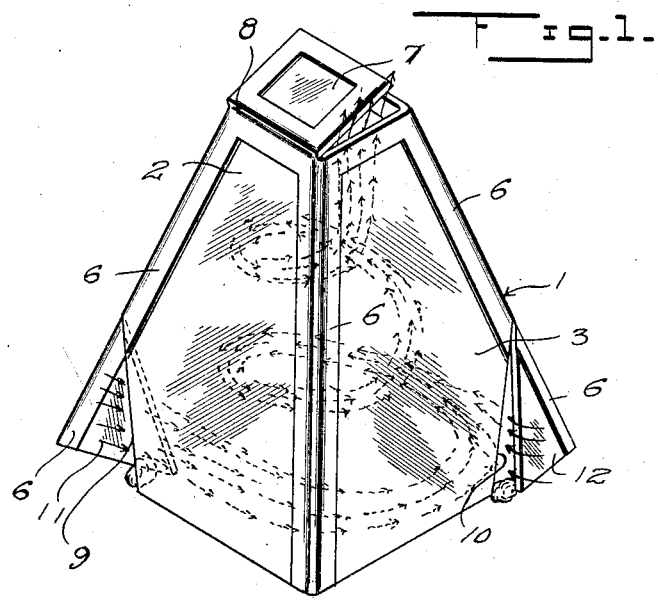
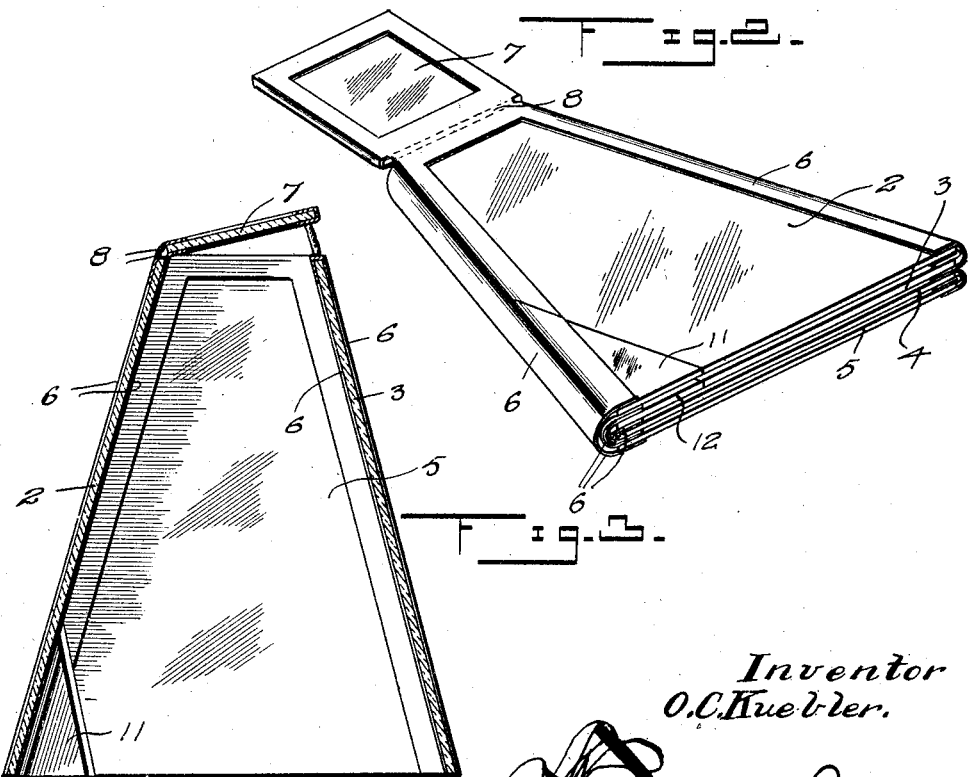
Inventor
O. C. Kuebler.

UNITED STATES PATENT OFFICE.

OTTO C. KUEBLER, OF YONKERS, NEW YORK.

COLLAPSIBLE AND VENTILATING BELL OR FORCING-GLASS.

1,392,178. Specification of Letters Patent. Patented Sept. 27, 1921.

Application filed April 16, 1919. Serial No. 290,377.

*To all whom it may concern:*

Be it known that I, OTTO C. KUEBLER, a citizen of the United States, residing at Yonkers, in the county of Westchester and State of New York, have invented certain new and useful Improvements in Collapsible and Ventilating Bells or Forcing-Glasses; and I do hereby declare the following to be a full, clear, and exact description of the invention, such as will enable others skilled in the art to which it appertains to make and use the same.

This invention relates to forcing bells or glasses, and the primary object of the invention is to provide an improved means for effectively protecting young plants from the cold and to permit a maximum amount of heat and light to act upon the plants so as to give all kinds of vegetation an early start in the spring and to prolong the growing season thereof.

Another object of the invention is to provide an improved forcing glass or bell which will effectively protect the plants from all kinds of insects.

A further object of the invention is to provide an improved forcing glass or bell, which is so constructed that the same can be readily ventilated and thus give the growing plants the maximum amount of fresh air.

A still further object of the invention is to provide a plant protector which can be readily and quickly collapsed, so that the same may be stored away in a very small space.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved bell or forcing glass in its set-up position, Fig. 2 is a perspective view showing the same in its collapsed position, and Fig. 3 is a vertical sectional view illustrating the device.

Referring to the drawings in detail, wherein similar reference characters designate corresponding parts throughout the several views, the numeral 1 generally indicates the improved bell or forcing glass, which includes the four trapezoid shaped side walls 2, 3, 4, and 5, which are of substantially the same size and shape. The walls are hingedly connected together, by suitable flexible strips 6, which are preferably made from waterproof material and these strips are secured to the inner and outer surfaces of the walls at the meeting edges thereof by suitable waterproof and heat resisting cement or the like. The wall 2 has hingedly connected to its upper end a substantially rectangular plate 7, which forms a closure for the device, when the same is in its set-up position and this plate or closure engages the upper edges of the side walls and forms means whereby a complete closed housing is provided. This lid 7 is connected to the wall 2 by means of suitable waterproof flexible strips 8. The walls and the lid 7 are formed of transparent material such as glass or the like and the means for connecting the walls and lid together allow the device to be readily collapsed or folded, as shown in Fig. 2 of the drawings.

In folding, the walls 2 and 3 rest on wall 4 and wall 4 on wall 5. The strips which join the walls 2 and 5 together are formed relatively wider than the other strips, so as to permit the strips to readily engage over the edges of the walls 3 and 4 when the device is in its folded position, as clearly shown in Fig. 2 of the drawings. The opposite lower side edges of the walls 2 and 3 are provided with openings 9 and 10, which are arranged to be closed by doors 11 and 12 which are hingedly connected in position by means of the strips 6.

The doors 10 and 11 form means for allowing the entrance of air into the device and when it is desired to ventilate the same, one of the doors 11 or 12 is swung inwardly and held in its open position by a clod of dirt or the like and the other door is swung outwardly and held in open position by a clod of dirt or the like and the upper lid 7 is held open by any suitable support such as a twig or the like. The arrangement of the doors 11 and 12 opening inwardly and outwardly allows the air to come in around the inner surface of the device and as the same becomes heated gradually rises and forms a spiral current of air, which exits through the upper end of the device.

From the foregoing description, it can be seen that an improved plant protector is provided, which allows the plants to be transplanted earlier in the spring, than which would otherwise be permitted and thus allow them to mature earlier and a more profitable market obtained. The device also protects the plants against insects and when the glass is removed from the plants, the same are sufficiently strong and healthy to resist the insects. Thus, the device is invaluable in combating the boll weevil.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A plant forcing device comprising a body consisting of pairs of side walls hinged together and forming an opening at their upper ends, a hinge cover for said opening, some of said walls having openings at their lower ends and located opposite to each other, and hinged doors for the last named openings, and one of said doors adapted to open inwardly of the side walls and the other door open outwardly thereof, said doors when in an open position adapted to cause an air current to pass through the device and outwardly of the first opening in a spiral path.

In testimony whereof I affix my signature in presence of two witnesses.

OTTO C. KUEBLER.

Witnesses:
WILLIAM J. TERRY,
ROBERT G. CONKEY.